Patented Dec. 15, 1936

2,064,073

UNITED STATES PATENT OFFICE 2,064,073

TREATMENT OF LEATHER WITH INDIA RUBBER

Alexander McLennan, Chesterfield, England, assignor to Oscar Cecil Hartridge, London, England No Drawing. Application October 18, 1934, Serial No. 748,968. In Germany June 14, 1934

5 Claims. (Cl. 91—68)

This invention comprises improvements in or relating to the treatment of leather with indiarubber and has for its principal object to attain increased impregnation of the leather, and particularly chrome leather, with the rubber, so that it may be more waterproof and, by virtue of its high water-resisting properties, be especially suitable for pump leathers and for all leathers required effectively to resist damp or moisture.

A further object is to increase the strength and pliability of the leather and in certain cases to secure more effective impregnation thereof with certain gums and resins capable of enhancing the adhesive or gripping properties, thereby rendering the leather of very favourable application for use, for example, in machinery belting.

Another important object of the invention is to enable rubber-impregnated leather to be produced in a highly economical manner and a further object is to provide for more advantageous cold-vulcanization of the rubber in the leather.

Finally, another object is to enable colouring of the leather to be achieved in simple and effective manner and without the labour heretofore involved in the usual procedure of brushing on the colours.

According to this invention, an improved process of treatment is provided which comprises impregnating leather with rubber in the presence of deresination products of rubber, gutta-percha or balata or mixtures of these products.

By these deresination resinous products is meant the products obtained by treatment of rubber, gutta-percha and balata with suitable solvents to remove the so-called resins. In commercial manufacture, these resins are systematically removed from the commoner grades of rubber in order to increase the value of the rubber. They have to be removed also from gutta-percha and when balata is used in the manufacture of golf-balls, it is invariably deresinated so as to harden it.

The incorporation of these deresination products or resins in the rubber impregnating solution or solutions used, has the surprising result that a considerably deeper and more intense impregnation of the leather is attained, without sacrificing the amount of rubber in the solution. The impregnation varies, of course, according to the nature of the leather, but in all cases a comparatively high degree of penetration results with consequent improvement in the degree of filling of the pores or interstices with rubber. In some cases, the prepared rubber solutions are found to penetrate the pores right through the thickness of the leather. A further important advantage of these deresination products is that they act as vulcanization accelerators so that the increased filling of rubber is effectively consolidated, after impregnation is complete, with considerable advantage from the point of view of improving the flexibility of the leather. The penetration of the leather by the solution is equally intense or effective, when a further addition of gums, resins or gum-resins is made with the object of imparting a desired characteristic to the leather or its surfaces.

Being of the nature of a by-product in the manufacture of rubber or of rubber or like articles, these deresination products are to be comparatively cheaply obtained and as they also enable less rubber solution or fewer rubber solutions to be used in the impregnation procedure, they enable the treatment of the leather to be effected much more economically than is possible with methods at present in use.

The cold-vulcanization of the rubber in the leather is preferably provided for by embodying a cold-vulcanizing agent or agents, such as a precipitated sulphur solution, in the rubber solutions. If desired, and towards the end of the impregnation procedure, another cold-vulcanizing agent or mixture may be added. In this way, it has been found possible to avoid a disadvantage heretofore associated with chloride of sulphur which, in the treatment of leathers which have initially been clarified or freed from grease by means of sulphur solutions, has been found to be detrimental to the process to a certain degree if used in sufficient quantities and if used in lesser quantities has been found ineffective. It is also preferred in this invention to use a modified clarifying or grease-removing solution for the leather, composed of carbon disulphide and a solvent such as petrol spirit.

The precipitated sulphur solution may conveniently be prepared from a stock solution by taking a desired amount of the stock and precipitating the undissolved sulphur with amyl acetate or acetone, or a mixture of these substances, and toluol and petrol spirit or ether and benzol. A clear solution is thus obtained which is free from undissolved sulphur and is a very effective cold-vulcanization agent.

For the purpose of colouring the leather, when required, the invention provides for the introduction of colouring matter into the impregnating solutions so that the colouring is effected during the impregnating process instead of having to be applied by hand. In this way, the leather also becomes coloured right through and not merely on, or in the region of, the outer surface.

In carrying the invention into practice, the leather after being subjected to any necessary preliminary treatment, is treated with clarifying or grease-removing solution and afterwards with a solution or solutions containing the rubber and deresination products and cold-vulcanizing agents. For imparting enhanced adhesive or gripping qualities suitable gums, resins, gum-resins or the like such as gum elemi, gum dammar, coumarone or amber or mixtures of these may be incorporated in the treatment solutions and colouring matter may also be introduced if desired. The whole of the impregnating treatment is preferably carried out in a revolving drum so that the procedure may be as practical and effective as possible and waste of material or solutions be avoided.

For the preparation of the impregnating solutions, rubber may first be dissolved in coal-tar solvent naphtha and the precipitated sulphur solution referred to, together with petrol or hydrocarbon spirit. Then a solution of gum, resin, gum-resin or the like such as gum elemi, gum dammar, coumarone or amber, or of the latter two, may be added and after well mixing there may be further added the deresination product of rubber, gutta-percha or balata. Or any two or all of the deresination products, for instance the rubber and gutta-percha products or the rubber and balata products, may be used in admixture for example about equal proportions of each. The products may be cleansed or clarified before use if necessary or desired. The whole is then well mixed and if colouring is to be effected there may then be added a colouring solution composed of powdered aniline dye, or other appropriate dye, dissolved in a suitable solvent such as coal-tar solvent naphtha.

Suitable examples of the several solutions which have been found to provide good results in practice are as follows, though it is to be understood that the invention is not restricted to the particular proportions stated as these may vary according to circumstances:—

For the clarifying solution, 1 pint of carbon disulphide and 4 to 5 gallons of petrol spirit.

For the stock sulphur solution 1 lb. of powdered sulphur and 4 to 5 pints of carbon disulphide. The mixture of these is allowed to stand for about 48 hours, with occasional agitation, before using.

For the precipitated sulphur solution, 1 pint of the stock solution, ½ pint of amyl acetate or acetone (or ¼ pint of each together), 1 pint of toluol and 1 pint of petrol spirit. The mixture of these is agitated and after standing for a short period, the clear liquid is removed.

For the rubber solution:

(a) 1 lb. of India rubber, 1 to 1½ gallons of coal-tar solvent naphtha, 1 to 1½ pints of precipitated sulphur solution and 1½ to 4 gallons of petrol or hydrocarbon spirit.

(b) 1 lb. of India rubber, 1 to 1½ gallons of coal-tar solvent naphtha, 1 to 1½ pints of precipitated sulphur solution and 1 to 3½ gallons of petrol or hydrocarbon spirit.

(c) 1 lb. of India rubber, 1 to 1½ gallons of coal-tar solvent naphtha, 1 to 1½ pints of precipitated sulphur solution and ½ to 3 gallons of petrol or hydrocarbon spirit.

For the gum, resin, gum-resin or like solution, 1 lb. of either gum elemi, gum dammar, coumarone or amber (or ½ lb. each of the latter two) is dissolved in about 1 pint of toluol or coal-tar solvent naphtha and about one pint of petrol or hydrocarbon spirit.

For the colouring solution, ¼ lb. of powdered aniline dye or other suitable dye and about 1 gallon of coal-tar solvent naphtha.

The deresination products referred to are sold commercially in the form of distillation residues and they may conveniently be used in the proportion of about 100 per cent of the weight of rubber used in the preparation of the impregnating solutions, though the proportion may vary according to circumstances as will be understood, and may be as wide, for example, as 75 to 150 per cent or more if so desired.

For practical purposes, three impregnating solutions may be made up for use and designated respectively "No. 1 light impregnating solution", "No. 2 medium impregnating solution", and "No. 3 heavy impregnating solution", these being prepared from the respective rubber solutions (a), (b) and (c) above with the gum, resin, gum-resin or like solution, deresination product and, if desired, colouring solution incorporated in each in the manner stated and prepared and proportioned in accordance with the examples.

The three solutions are advantageously used in rotation in quantities varying according to circumstances. The quantity required for the first treatment with the No. 1 light impregnating solution will entirely depend upon the weight and absorptive power of the leather within the drum. By way of example, if the weight of the leather be 200 lbs. the quantity of solution might be about 16 gallons, but the exact quantity will depend on how the leather is absorbing the solution and on the ingredients and their proportions. As the leather at first is dry and absorbs quickly it is preferable to introduce the whole of No. 1 solution at one time into the drum though it may be added in suitable fractions or doses at appropriate intervals if desired. In the later stages, when the leather is getting filled and denser solutions are being used, it is necessary or advisable to introduce these in smaller quantities or doses. Thus after a short period of drum treatment with No. 1 solution, about 6 to 8 gallons of No. 2 medium impregnating solution is similarly introduced into the drum in doses of say 3 to 4 gallons and, after treatment for a further period, about 6 gallons of No. 3 heavy impregnating solution is introduced in doses of say 3 gallons into the drum. The exact quantity of the heavy solution will again depend upon the absorptive power of the leather but it will be introduced until the operator is satisfied that the leather will absorb no more.

The ingredients and proportions may also vary according to the type of leather being treated. The treatment just described is very suitable for use generally where increased strength, waterproofness and pliability is to be imparted to the leather. For soft leathers, however, deresination products derived from soft or very soft gums, particularly very soft gutta-percha, may be used. In addition, however, the solutions of gums, resins, gum-resins or the like may be reduced in quantity or density, or some or all of them omitted.

The colouring matter is suitably made up as a stock solution and used in the proportion of about 1 gallon taken from stock to about every four gallons of the impregnating solutions but the proportions may vary to a certain extent, or the strength of the dye solution be varied, or both, according to circumstances or according to whether tan or black shades of colour are desired. In some cases the colouring solution may be mixed in with No. 1 impregnating solution and in others with Nos. 1 and 2 or Nos. 2 and 3, or it may be found necessary to mix it with Nos. 1, 2 and 3. When colouring solutions are used— the rubber solutions may be made slightly stronger than when colouring is not desired to avoid any tendency to undue thinning of the impregnating solutions.

The further cold-vulcanization agent, if used, is suitably introduced in solution into the revolving drum a short time, say about 1 hour, before the drumming is completed and in order that it may be introduced while the drum is revolving, the latter is conveniently provided with a hollow ported axle or other suitable provision made for the purpose.

I claim:—

1. Process of impregnating leather with india rubber comprising increasing the penetrability of a thick india rubber solution by adding thereto a substantial quantity of extracted resin of rubber, gutta-percha or balata and impregnating the leather with the resulting composition.

2. Process of impregnating leather with india rubber comprising increasing the penetrability of a dense rubber solution by adding thereto a substantial quantity of solid or undissolved resins of rubber, gutta-percha or balata and impregnating the leather with the resulting composition.

3. Process of impregnating leather with india rubber comprising increasing the penetrability of dense india rubber solution by adding thereto a substantial quantity of resin of rubber, gutta-percha, or balata, adding to the solution a cold vulcanizing agent and impregnating the leather with the resulting composition.

4. Process of impregnating leather with india rubber comprising increasing the penetrability of dense india rubber solution by adding thereto a substantial quantity of resin of rubber, gutta-percha, or balata, adding to the solution a cold vulcanizing agent, impregnating the leather with the resulting composition, and applying further cold vulcanizing agent to the leather toward the end of the treatment.

5. Process of impregnating leather with india rubber comprising increasing the penetrability of dense india rubber solution by adding thereto a substantial quantity of resin of rubber, gutta-percha, or balata and coumarone or gum elemi and impregnating the leather with the resulting composition.

ALEXANDER McLENNAN.